(No Model.)

G. H. HULL.
COMBINED SPECTACLES AND WATCH MAKER'S EYEGLASS.

No. 320,558. Patented June 23, 1885.

WITNESSES:
Theodore Langbein.
Benh. Lizius.

INVENTOR:
Granville H. Hull,
Per James B. Lizius & Co.
Attorneys.

UNITED STATES PATENT OFFICE.

GRANVILLE H. HULL, OF LAFAYETTE, INDIANA.

COMBINED SPECTACLES AND WATCH-MAKER'S EYEGLASS.

SPECIFICATION forming part of Letters Patent No. 320,558, dated June 23, 1885.

Application filed April 14, 1885. (No model.)

*To all whom it may concern:*

Be it known that I, GRANVILLE H. HULL, a citizen of the United States, residing at Lafayette, in the county of Tippecanoe and State of Indiana, have invented a Watch-Maker's and Jeweler's Combined Spectacles and Eyeglass, of which the following is a specification.

The objects of my invention are to provide for watch-makers, jewelers, and, in general, for all persons in need of spectacles and an eyeglass in the pursuit of their profession, a device which will enable them to use either the spectacles alone or the spectacles and the eyeglass without necessitating the use of one hand to hold the eyeglass. Heretofore in case the operator could not spare the use of one hand to hold the eyeglass he had to remove the spectacles before he could get the benefit of the glass, causing a loss of time and more or less inconvenience. These objections I overcome by the device illustrated in the accompanying drawings, in which—

Figure 1:
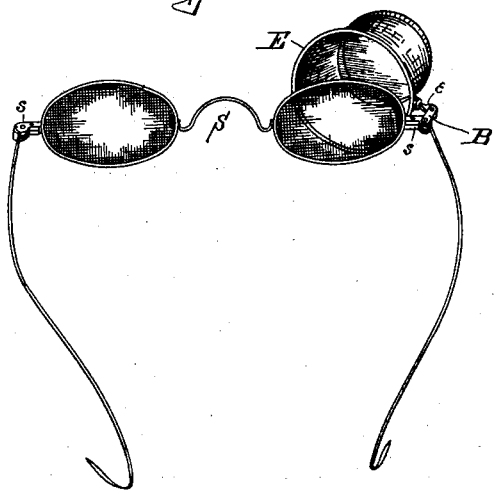
Figure 2:
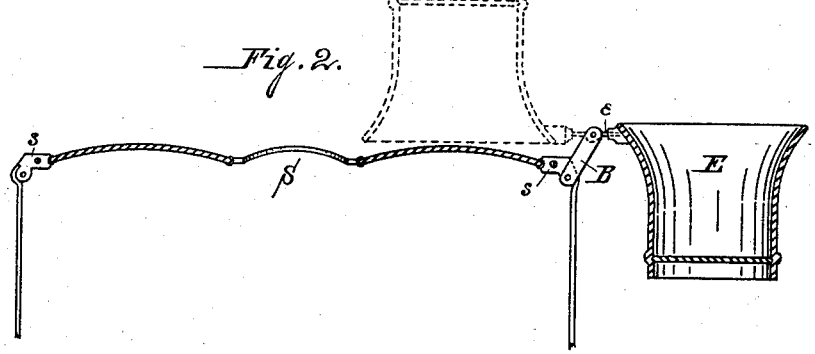
Figure 3:
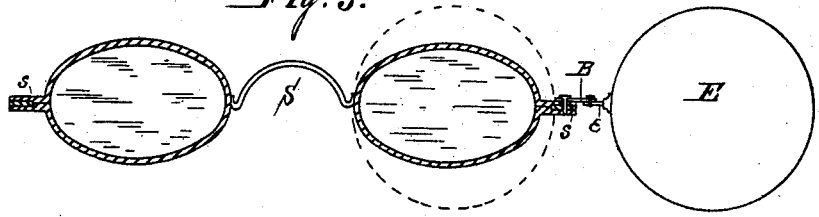
Figure 4:
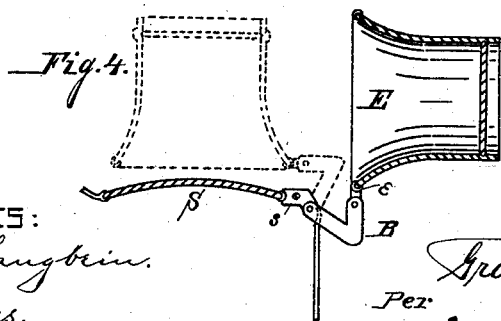

Figure 1 is a perspective view of my combined spectacles and eyeglass; Fig. 2, a horizontal section through the same; Fig. 3, a vertical section through the same; Fig. 4, a horizontal section showing a slightly-different method of attaching the eyeglass to the spectacles.

In Figs. 2, 3, and 4, the dotted lines show the eyeglass in position in front of the spectacle-lenses.

Similar letters refer to similar parts throughout the several views.

S are the spectacles, frame and lenses; s s, the end joints of the spectacle-frame. To either one of these joints s s, or to both, if desired, an eyeglass, E, is attached by means of a bracket, B, in such a manner that it can be readily thrown in front of the eye or away at the will of the operator. If the bracket B is firmly secured or riveted to the spectacle-joint s, it must be straight and extend forward from said joint s, and the eyeglass E must be hinged or pivoted to the fore end of the bracket B, in order to allow the glass to be swung around in front of the spectacle-lenses without interfering with the spectacle-frame; or if the bracket B is pivoted to the joint s, and firmly secured to the eyeglass E, the bracket must be V-shaped to allow of bringing the glass E snugly up in front of the spectacle-lenses. The former method is illustrated in Fig. 2, the latter in Fig. 4. The bracket B may also be pivoted at one end to the spectacle-joint s, and at the other end to the eyeglass E, to obtain same results. The connection between the end of the bracket B and the eyeglass E can be made in many different ways.

In Fig. 2 I show the bracket B pivoted to the eyeglass E by means of an intermediate arm, e, screwed into a shoulder on the frame of the eyeglass, while in Fig. 4 the bracket is riveted to a grooved wire, e, encircling the flange of the glass-frame.

I do not claim any special method of securing the bracket B to the eyeglass E; but

What I claim, and desire to secure by Letters Patent, is—

The combination, with a pair of spectacles, S, of an eyeglass, E, a bracket, B, secured to the joint s of the spectacle frame and supporting the eyeglass E, the spectacle-frame S, the bracket B, and the eyeglass E being connected together in such a manner as to allow the eyeglass to be thrown in front of the spectacle-lenses and away from them, substantially as described and specified.

In testimony whereof I have signed my name to this specification in the presence of two subscribing witnesses.

GRANVILLE H. HULL.

Witnesses:
L. G. HAMILTON,
CARL R. SEIFERT.